US011491889B2

(12) United States Patent
Blickle

(10) Patent No.: US 11,491,889 B2
(45) Date of Patent: Nov. 8, 2022

(54) VEHICLE, IN PARTICULAR LOGISTICS VEHICLE

(71) Applicant: SEW-EURODRIVE GMBH & CO. KG, Bruchsal (DE)

(72) Inventor: Christopher Blickle, Greenville, SC (US)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 156 days.

(21) Appl. No.: 16/468,216

(22) PCT Filed: Nov. 27, 2017

(86) PCT No.: PCT/EP2017/025347
§ 371 (c)(1),
(2) Date: Jun. 10, 2019

(87) PCT Pub. No.: WO2018/103892
PCT Pub. Date: Jun. 14, 2018

(65) Prior Publication Data
US 2019/0389328 A1    Dec. 26, 2019

(30) Foreign Application Priority Data

Dec. 9, 2016 (DE) .................. 10 2016 014 627.3

(51) Int. Cl.
*B60L 53/80* (2019.01)
*B60L 58/18* (2019.01)
(Continued)

(52) U.S. Cl.
CPC ............. *B60L 53/80* (2019.02); *B60L 50/40* (2019.02); *B60L 50/64* (2019.02); *B60L 58/18* (2019.02);
(Continued)

(58) Field of Classification Search
CPC ............. Y02T 10/7005; Y02T 90/127; B60L 2200/44; B60L 50/40; B60L 53/80;
(Continued)

(56) References Cited

U.S. PATENT DOCUMENTS 6,978,855 B2   12/2005   Kubota
8,779,622 B2   7/2014   Timmons
(Continued)

FOREIGN PATENT DOCUMENTS

DE   19641254 A1   4/1998
DE   10328582 A1   1/2004
(Continued)

OTHER PUBLICATIONS

International Search Report dated Mar. 26, 2018, in International Application No. PCT/EP2017/025347 (English-language translation).
(Continued)

*Primary Examiner* — Jared Fureman
*Assistant Examiner* — Duc M Pham
(74) *Attorney, Agent, or Firm* — Carter, DeLuca & Farrell LLP

(57) ABSTRACT

A vehicle, in particular a logistics vehicle, includes a frame and a housing component secured in place thereon. An insert part on the housing component is insertable into a space region of the vehicle, and a first or a second energy store module is situated on the insert part and a DC/DC converter which is electrically connected to the energy store module.

24 Claims, 8 Drawing Sheets

(51) Int. Cl.
*B60L 50/64* (2019.01)
*B60L 50/40* (2019.01)
*H01M 10/42* (2006.01)
*H01M 16/00* (2006.01)
*B60R 16/023* (2006.01)

(52) U.S. Cl.
CPC ....... *H01M 10/4264* (2013.01); *H01M 16/00* (2013.01); *B60L 2210/10* (2013.01); *B60R 16/023* (2013.01); *H01M 2220/20* (2013.01)

(58) Field of Classification Search
CPC ...... B60L 2210/10; B60L 58/18; Y02P 90/60; H01M 2220/20; H01M 10/4264; H01M 16/00; B60R 16/023
See application file for complete search history.

(56) References Cited

U.S. PATENT DOCUMENTS

| | | | |
|---|---|---|---|
| 2001/0052433 A1 | 12/2001 | Harris et al. | |
| 2002/0168556 A1* | 11/2002 | Leboe | H01M 10/615 |
| | | | 429/423 |
| 2009/0146493 A1* | 6/2009 | Fujino | B60L 15/2045 |
| | | | 307/9.1 |
| 2013/0320759 A1* | 12/2013 | Abe | H02J 50/80 |
| | | | 307/10.1 |
| 2015/0336465 A1 | 11/2015 | Luke et al. | |
| 2016/0244008 A1* | 8/2016 | Bourgeais | B60L 58/40 |

FOREIGN PATENT DOCUMENTS

| | | |
|---|---|---|
| DE | 102005042940 A1 | 3/2007 |
| DE | 102009014386 A1 | 9/2010 |
| DE | 102010021705 A1 | 12/2011 |
| DE | 102012210967 A1 | 1/2013 |
| DE | 102011115570 A1 | 4/2013 |
| DE | 102014006960 A1 | 11/2015 |
| EP | 2340951 A2 | 7/2011 |
| WO | WO-02067346 A2 * | 8/2002 .......... B66F 9/07572 |
| WO | WO 2002067346 A2 | 8/2002 |

OTHER PUBLICATIONS

International Preliminary Report on Patentability issued from the International Bureau dated Jun. 20, 2019.

* cited by examiner

VEHICLE, IN PARTICULAR LOGISTICS VEHICLE

FIELD OF THE INVENTION

The present invention relates to a vehicle, in particular a logistics vehicle.

BACKGROUND INFORMATION

Certain conventional vehicles can be used to transport loads, for which purpose an energy store for the supply of electrical consumers, in particular an electromotoric traction drive of the vehicle, can be provided in the vehicle.

SUMMARY

Example embodiments of the present invention provide a vehicle in which an adaptation of the vehicle to different applications is possible.

According to an example embodiment of the present invention, a vehicle, in particular a logistics vehicle, includes a frame and a housing component which is secured in position thereon. An insert part on the housing component is able to be inserted into a space region of the vehicle. A first or second energy store module is situated on the insert part and a DC/DC converter, which is electrically connected to the energy store module. The first energy store module differs from the second energy store module, especially in its mode of action, and/or the first energy store module is a battery or an accumulator, and the second energy store module is a double layer capacitor and/or an ultracap capacitor.

This has the advantage that a rapid exchange of the energy store module for another energy store module is able to be carried out with the aid of the insert part. Thus, an empty or defective energy store module may be exchanged by simply pulling out an insert part and inserting a fully charged and/or operative energy store module.

In addition, the type of energy store module is adaptable to the particulars of the system and the sequences to be performed. A first energy store may provide a battery or an accumulator so that slow charging and discharging and/or low peak current values during the charging or discharging operation are possible. If the first energy store module is exchanged for the second one, an ultracap is able to be inserted, which may store lower quantities of energy but allows for higher peak current values during a charging or discharging process. Very rapid charging is possible in such a manner.

As an alternative, the vehicle may also be operated without the insert part. To do so, an inductive supply via a secondary winding on the underside of the vehicle is possible, and all consumers of the vehicle are supplyable from the secondary winding as long as they are inductively coupled with sufficient strength to a primary conductor installed in the floor.

In example embodiments, the housing component is arranged in the shape of a trough in order to guide and/or center the insertion part, and the depression of the trough extends in the insertion direction, in particular. This is considered advantageous insofar as precise guidance is provided during the insertion, thereby making it possible to bring a plug-connector part into contact with a mating plug-connector part without any tilting. The trough shape particularly functions as guide for the insert part when the insert part is inserted.

In example embodiments, the housing component has uninterrupted slots, in particular slots which are set apart from one another at regular intervals in the insertion direction. This offers the advantage of achieving a more optimal heat dissipation. An airflow through the slots is induced, especially when the vehicle is moving, which streams through the recess in the base plate in the direction of the insert part.

In example embodiments, the insert part has a base plate which includes a recess, the perpendicular projection of the recess into the driving surface of the vehicle overlapping with the perpendicular projection of the slots into the driving surface, in particular so that cool air entering through the slot is conveyed through the recess to cooling fins of the DC/DC converter. This offers the advantage that the flow of cool air passes through and also reaches the energy store module, which may therefore be cooled in a simple manner.

In example embodiments, the DC/DC converter has cooling fins on its side facing the base plate. This offers the advantage that the heat of the cooling fins is able to be dissipated not only to the air surrounding the cooling fins but to the base plate as well. The base plate allows for further spreading of the heat, so to speak. In addition, the base plate is connected to the frame of the vehicle, which is metallic and thus lends itself to the dissipation of heat.

In example embodiments, the DC/DC converter is electrically connected to an intermediate circuit by which an inverter feeding an electric motor may be supplied, especially for driving a wheel of the vehicle. This offers the advantage that the inverter is able to be supplied from the intermediate circuit so that a three-phase alternating voltage for the electric motor may be supplied with the aid of the inverter. In addition, further consumers, in particular the control, are also supplyable via the intermediate circuit, so that the energy store of the vehicle will not be stressed. It is also possible to supply power to the intermediate circuit that is inductively transmitted to the secondary winding of the vehicle and is conveyed to the intermediate circuit via the AC/DC converter. A capacitance is connected to the secondary winding in series and/or parallel, which is dimensioned such that the resonant frequency of the oscillating circuit created in this manner substantially corresponds to the frequency of the alternating current impressed into the primary conductor. Because of this resonant transmission, high efficiency of the inductive, contact-free transmission of the electrical power is achievable even with a fluctuating inductive coupling.

In example embodiments, a plug-connector part is situated on the base plate, which is brought into plug-in contact with a corresponding mating plug-connector part connected to the frame of the vehicle when the insert part is inserted. This is considered advantageous insofar as an automatic plug connection is achievable during the insertion.

In example embodiments, the plug-connector part is a hybrid plug-connector part, in which first contacts are particularly connected to a DC-voltage connection of the DC/DC voltage converter, and second contacts carry signals of a data bus, which is provided between a control of the vehicle and the DC/DC converter. This has the advantage that a power transmission and data transmission are available at the same time during the insertion.

In example embodiments, after the insert part has been inserted and the DC/DC converter has been electrically connected to the intermediate circuit of the vehicle, the DC/DC converter is automatically detected and operated as a bus subscriber of a data bus of the vehicle, in particular in order to control the energy flow according to the input by an energy management system. This is considered advantageous insofar as the vehicle is able to be operated even without the insert part. However, when an insert part is inserted, it is automatically detected and the DC/DC converter as a bus subscriber is therefore brought into an operative state, in particular activated by an address as bus subscriber.

In example embodiments, a secondary winding is situated on the underside of the vehicle, to which energy is transmittable from a primary conductor installed in the driving surface, in particular, it being possible to supply energy from the secondary winding to the intermediate circuit, in particular via an AC/DC converter. This has the advantage that an inductive, i.e. contact-free, supply may be achieved. The vehicle is therefore able to be guided along a long, floor-installed primary conductor and may simultaneously be charged with electrical energy. If an insert part with an energy store module is present, a temporary deviation from the track specified by the primary conductor may be possible.

In example embodiments, an energy store, in particular an accumulator or a battery, is situated on the frame of the vehicle, via which at least the control of the vehicle is able to be supplied. This offers the advantage that an emergency supply of the vehicle is possible if the inductive supply fails or the energy-store module has been depleted. Thus, the transmission of a warning, the operation of the safety devices such as sensors, etc., and/or a transfer of the vehicle to a safe area such as a parking space, etc., is made possible as a minimum.

In example embodiments, two side walls of the insert part are attached to the base plate, to which the second energy store module is screw-fitted using a screw that extends through the housing of the second energy store module, in particular so that a clearance is provided between the second energy store module and the base plate.

In example embodiments, a holding rail is fastened between, on which the first energy store module is held in a suspended manner, in particular so that a clearance exists between the first energy store module and the base plate. This has the advantage that the energy store module is thermally separated from the heat-generating DC/DC converter and may be cooled in a flow of cool air between the energy store module and the base plate.

In example embodiments, a handle is formed on the base plate. This offers the advantage that a simple operation is possible during the insertion.

In example embodiments, uninterrupted holes are situated on the housing component for securing the insert part with the aid of screws. This is considered advantageous because it allows for an easy insertion or pullout.

In example embodiments, the side wall holding the first or second energy store module is connected to the base plate. This has the advantage of making for an uncomplicated exchange.

In example embodiments, the space region is restricted also by at least the frame, the base plate, a housing sheet-metal part connected to the frame of the vehicle, and a cover plate. This has the advantage that the insert part is able to be placed in a protected space region.

Further features and aspects of example embodiments of the present invention are described in greater detail below with reference to the appended Figures.

DETAILED DESCRIPTION

Figure 1:
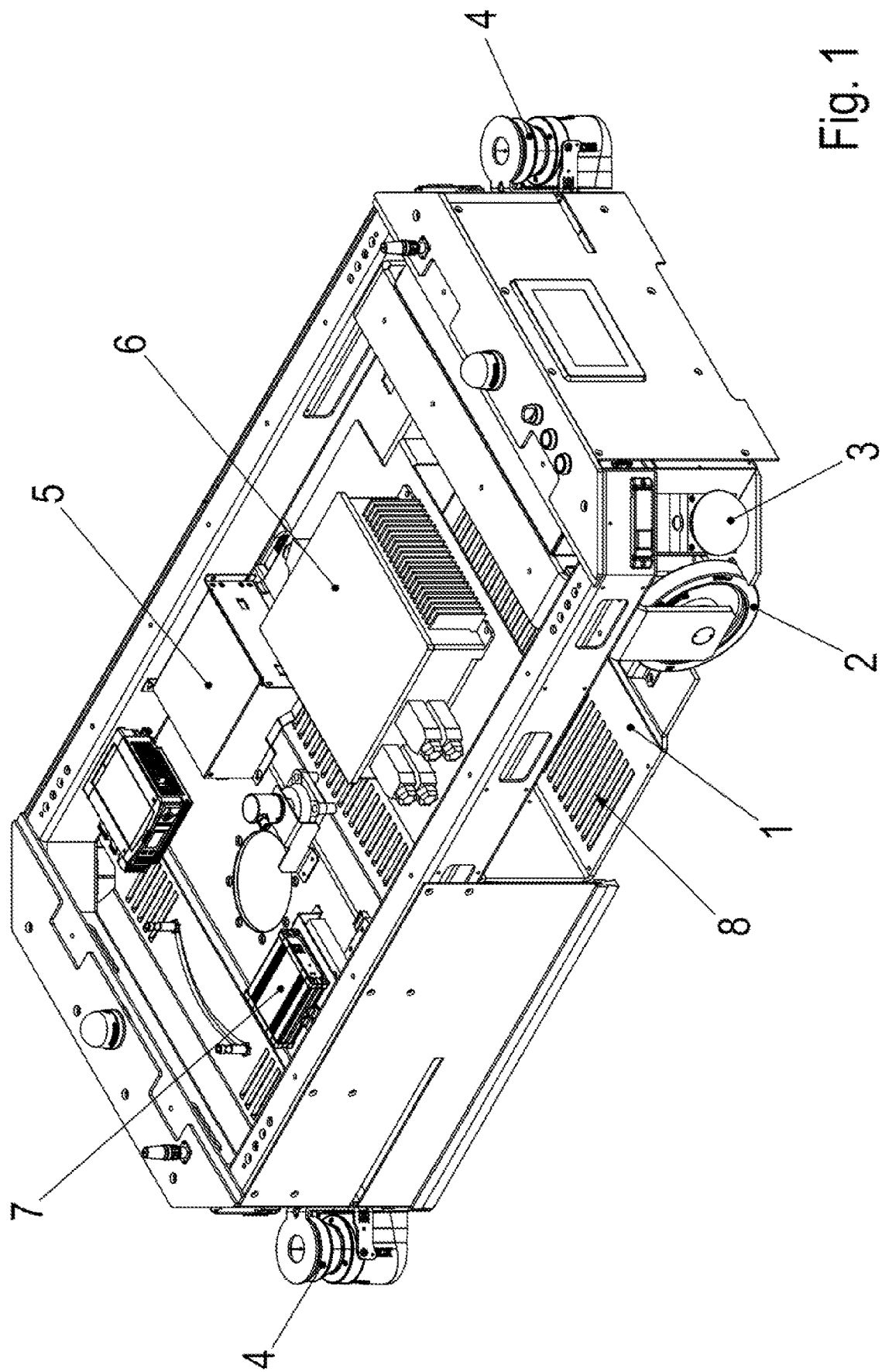
FIG. 1 shows a vehicle, in particular a driverless logistics vehicle, in which a space region is unoccupied.

As illustrated in the Figures, the vehicle has rotatably mounted wheels 2 on its frame, in particular for shunting the weight force of the vehicle into the driving surface. Wheels 2 may be arranged as steering rollers. The vehicle includes a rotatably disposed steering unit whose wheels are steerable and drivable by an electric motor.

A control 7, which actuates an inverter for the supply of the electric motor, is situated on the frame. This makes it possible to control the rotational frequency of the electric motor. In addition, control 7 controls the steering angle of the steering unit via a further electric motor. Control 7 thus controls the vehicle along a trajectory on the driving surface.

The vehicle includes an energy store 5, in particular a battery, which is used for the supply of control 7.

Disposed on the underside of the frame of the vehicle is a secondary winding, which is able to be inductively coupled to a primary conductor installed in elongated form on the driving surface. An alternating current is applied to the primary conductor, the frequency of the alternating current being between 10 kHz and 1 MHz. An inductive supply of the electrical consumers of the vehicle is therefore possible as long as the vehicle is positioned in close proximity to the primary conductor such that the inductive coupling between the primary conductor disposed on the driving surface and the secondary winding situated on the vehicle is sufficiently strong.

However, the inductive supply is not available if the vehicle deviates from a trajectory that follows the primary conductor. In such a case, control 7 will then be supplied via energy store 5. However, the energy quantity of energy store 5 is not sufficient to supply control 7 and additionally the electric motor over a long period of time.

Depending on the logistics system or production system in which the vehicle is used, a further energy store may be provided with the aid of an insert part that is able to be inserted into the space region.

For this purpose, the insert part is equipped with a respective energy store module (21, 31).

For example, a first energy store module 21 includes modules arranged as batteries or accumulators.

For instance, a second energy store module 31, which may be used as an alternative to first energy store module 21, includes modules which include a double layer capacitor and/or an ultracap in each case.

A DC/DC converter 24 is situated on base plate 27 of the insert part in each case, which converts the voltage supplied by energy store module 21 or 31 into an intermediate-circuit voltage, such as a voltage between 400V and 500V, from which the inverter is supplyable which feeds the electric motor used as a drive unit. The inverter has three half-bridges of controllable power semiconductor switches so that the inverter supplies a three-phase voltage to the electric motor on the output side, whose frequency and amplitude are predefined by control 7.

DC/DC converter 24 has cooling fins 26 and is situated on the base plate of insert part 27, and cooling fins 26 are situated on the side of DC/DC converter 24 facing insert part 27.

A trough-shaped housing component 1 is situated on the frame of the vehicle, the trough shape causing a depression. The insert part, in particular base plate 27 of the insert part, is slidingly inserted on housing component 1, the trough-shaped shaped depression extending in the insertion direction and thus serving as a guide during the insertion.

In front in the insertion direction, a hybrid plug-connector part is situated on the insert part, in particular on base plate 27 of the insert part, which is plugged into a corresponding mating plug-connector part disposed on the frame of the vehicle. Since the movement is carried out in a controlled manner, tilting is also avoidable when the plug-connector part is inserted into the mating plug-connector part.

The respective energy store module 21 or 31 is electrically connected to one of the two DC-voltage connections of DC/DC converter 24. The other DC-voltage connection is routed to the contacts of the hybrid plug-connector part.

A rapid connection may be obtained in this manner, and an insert part may be quickly exchanged during a service operation, for example, or when exchanging an insert part with a depleted energy store module (21, 31) for an insert part with a fully charged energy store module (21, 31).

Figure 2:
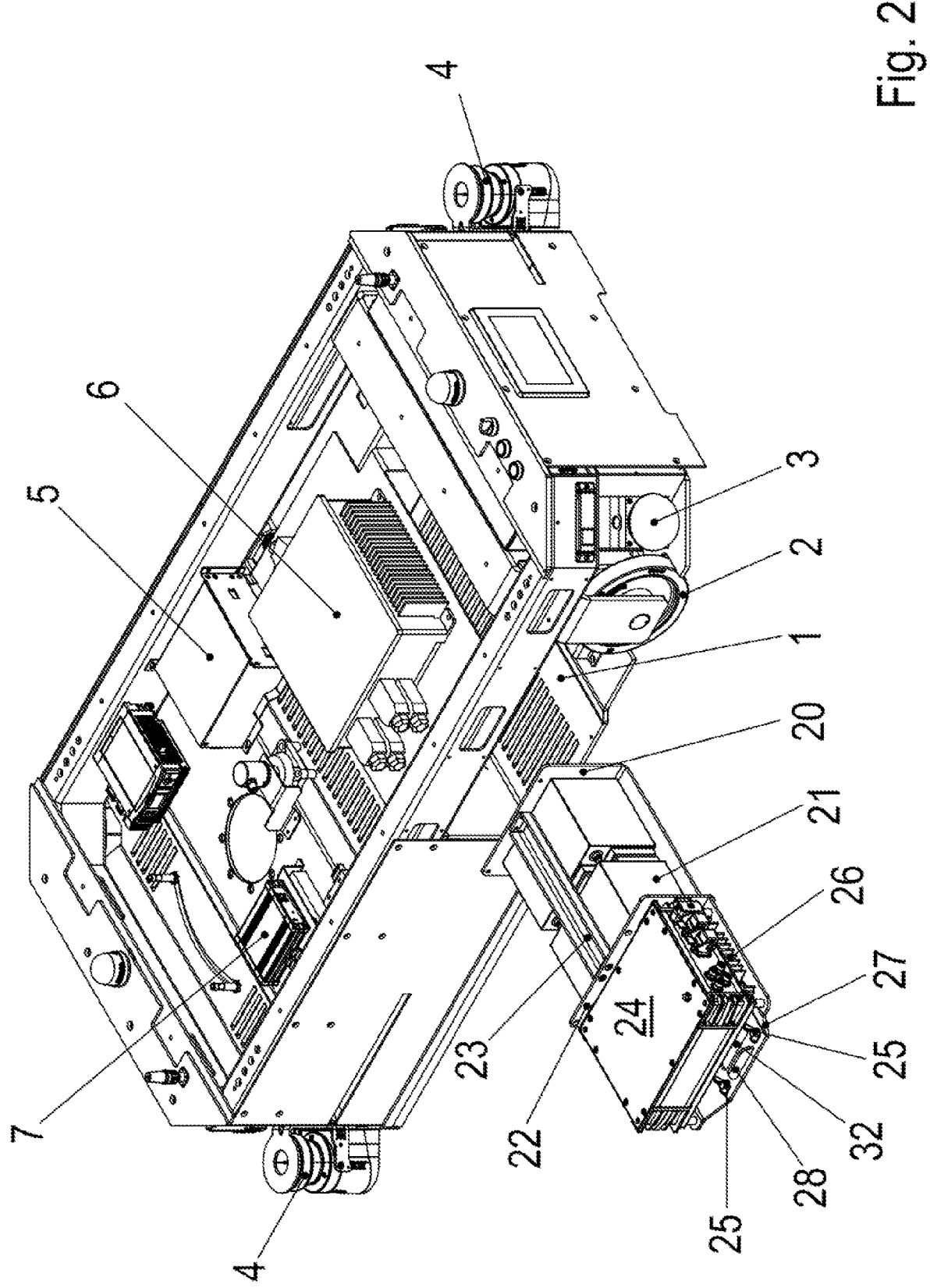
FIG. 2 shows an insert part during the insertion into the space region, where a first energy store module is accommodated by the insert part.

As illustrated in FIG. 2, first energy store module 21 is restricted by a holding rail 23, which interconnects two side walls 20 and 22 that are set apart from each other, thereby securing them with sufficient mechanical stability. First energy store module 21 is attachable to holding rail 23 in a suspended manner so that an air space exists between base plate 27 and first energy store module 21. First energy store module 21 is thereby thermally decoupled from base plate 27, and thus also from the heat flow of DC/DC converter 24 introduced into base plate 27 via cooling fins 26.

Figure 3:
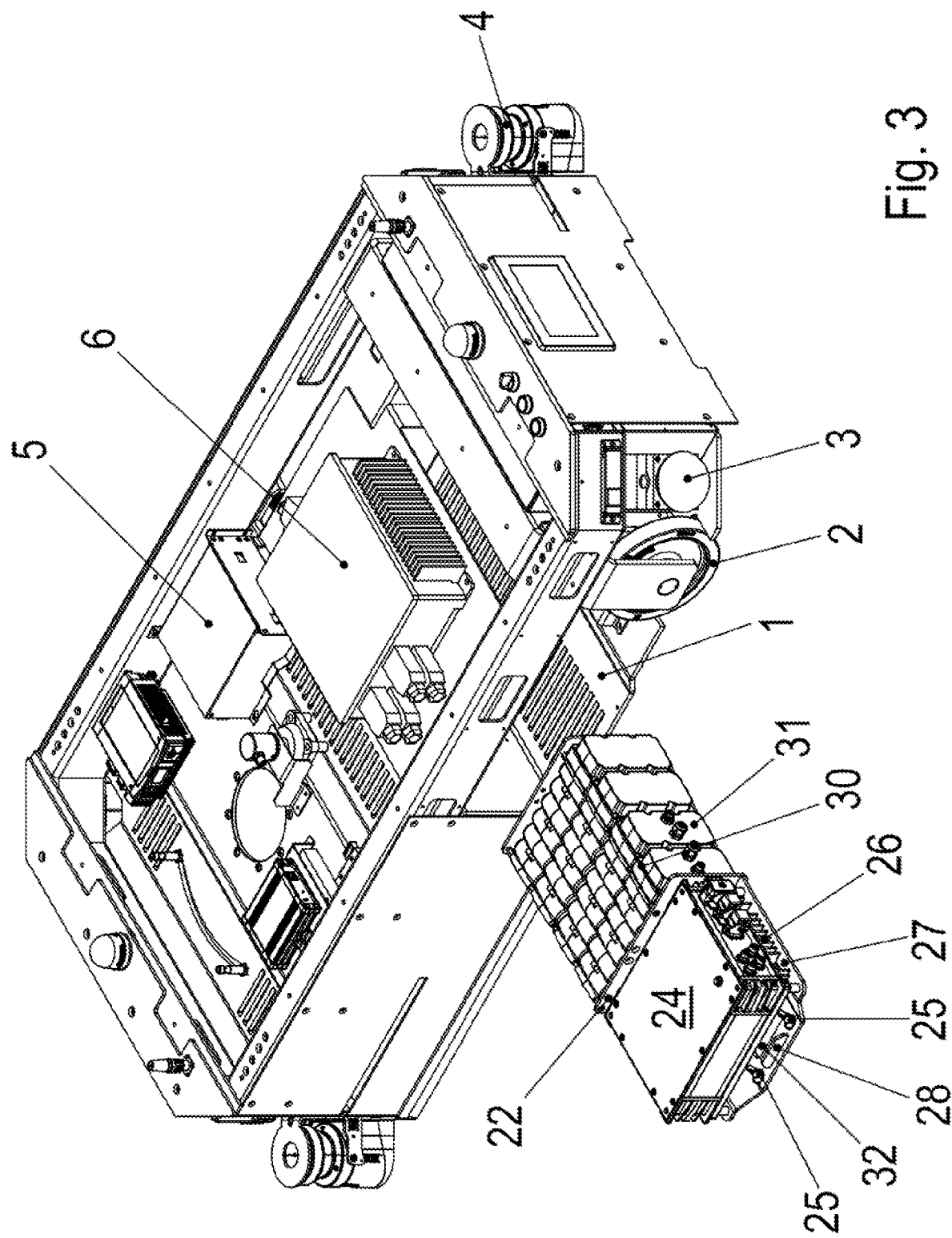
FIG. 3 shows an insert part, which is an alternative to the insert part from the exemplary embodiment illustrated in FIG. 2, during the insertion into the space region, the insert part accommodating a second energy store module.
Figure 4:
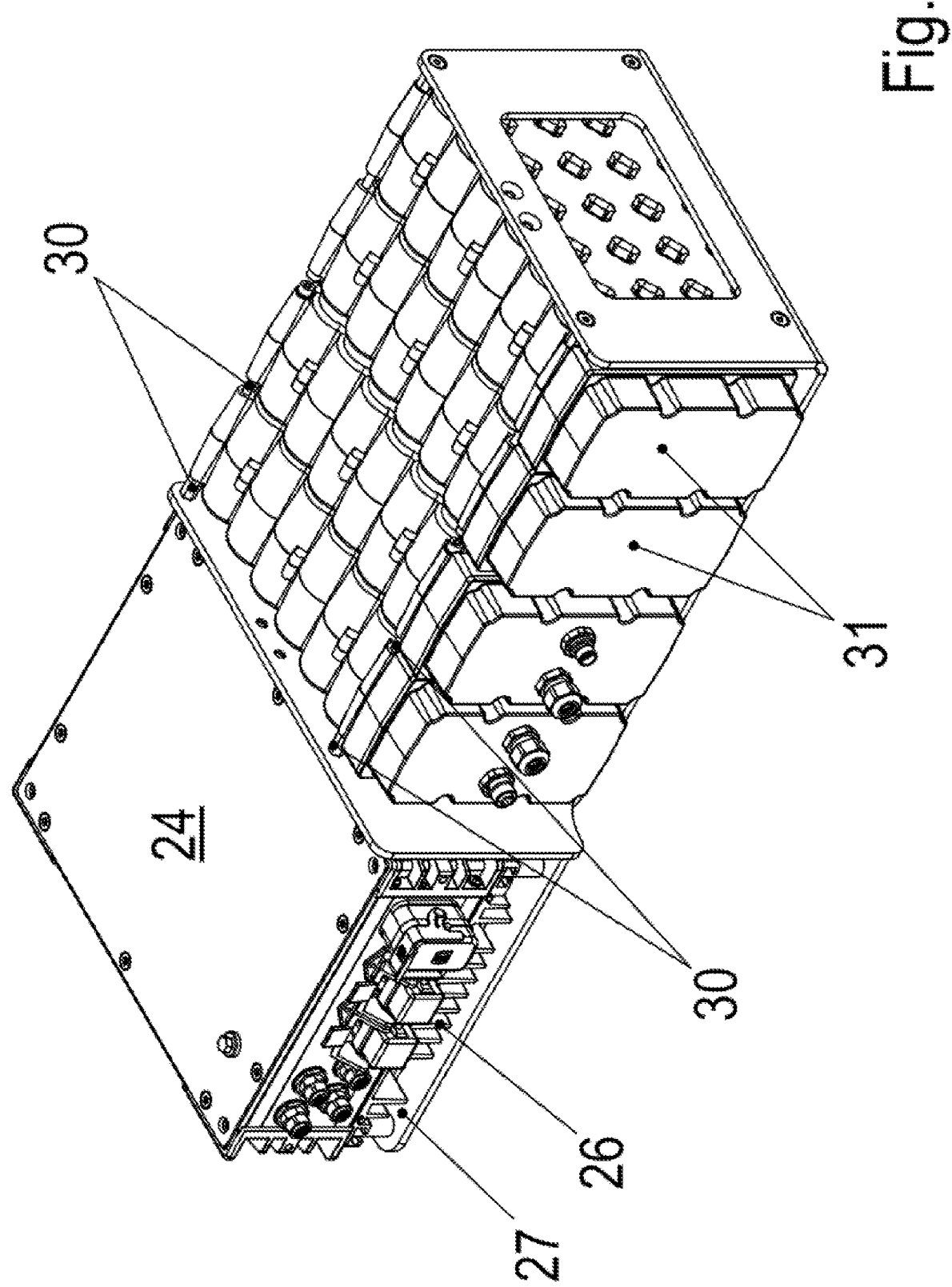
FIG. 4 shows the insert part with second energy store module from FIG. 3 in greater detail.
Figure 5:
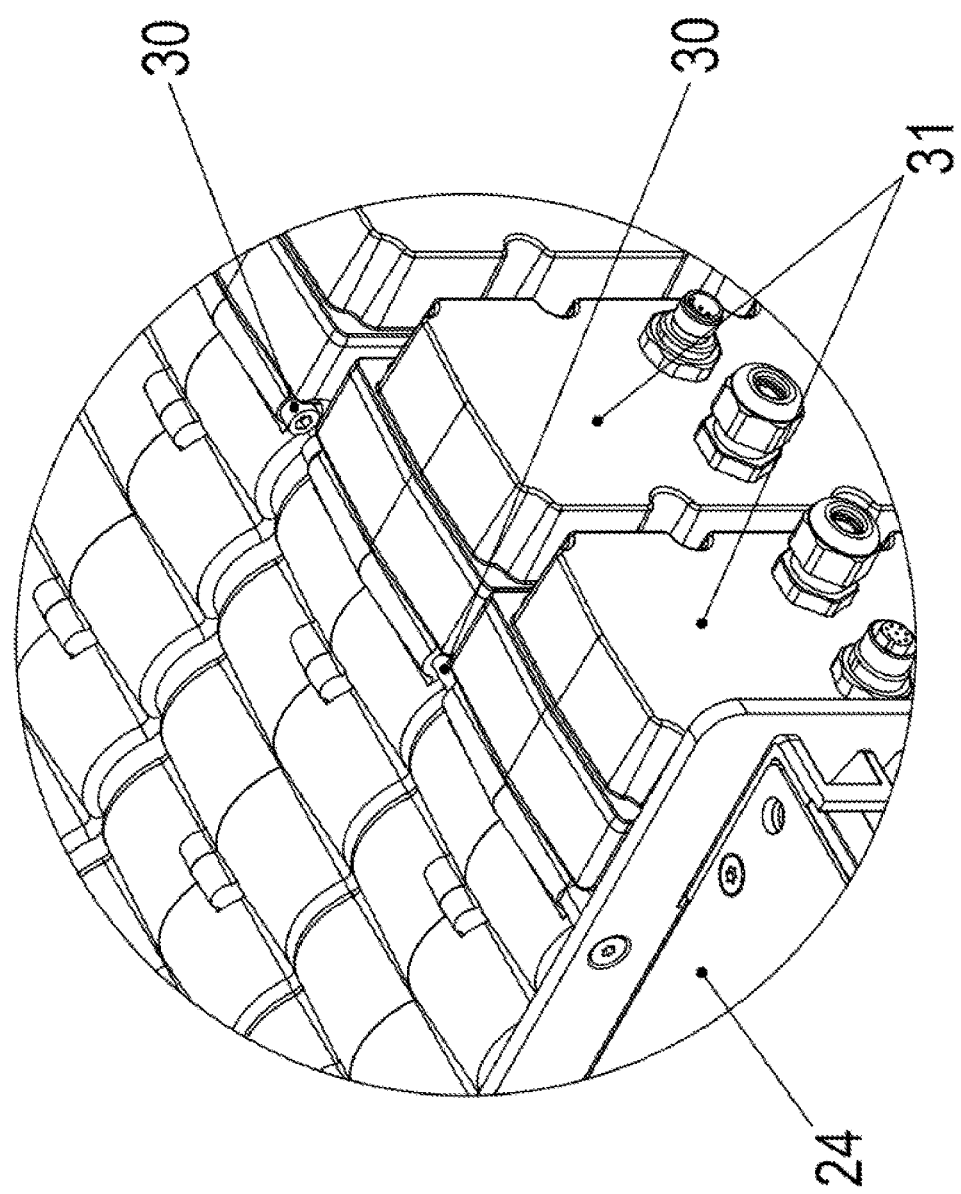
FIG. 5 shows a region of an oblique view of second energy store module in greater detail.
Figure 6:
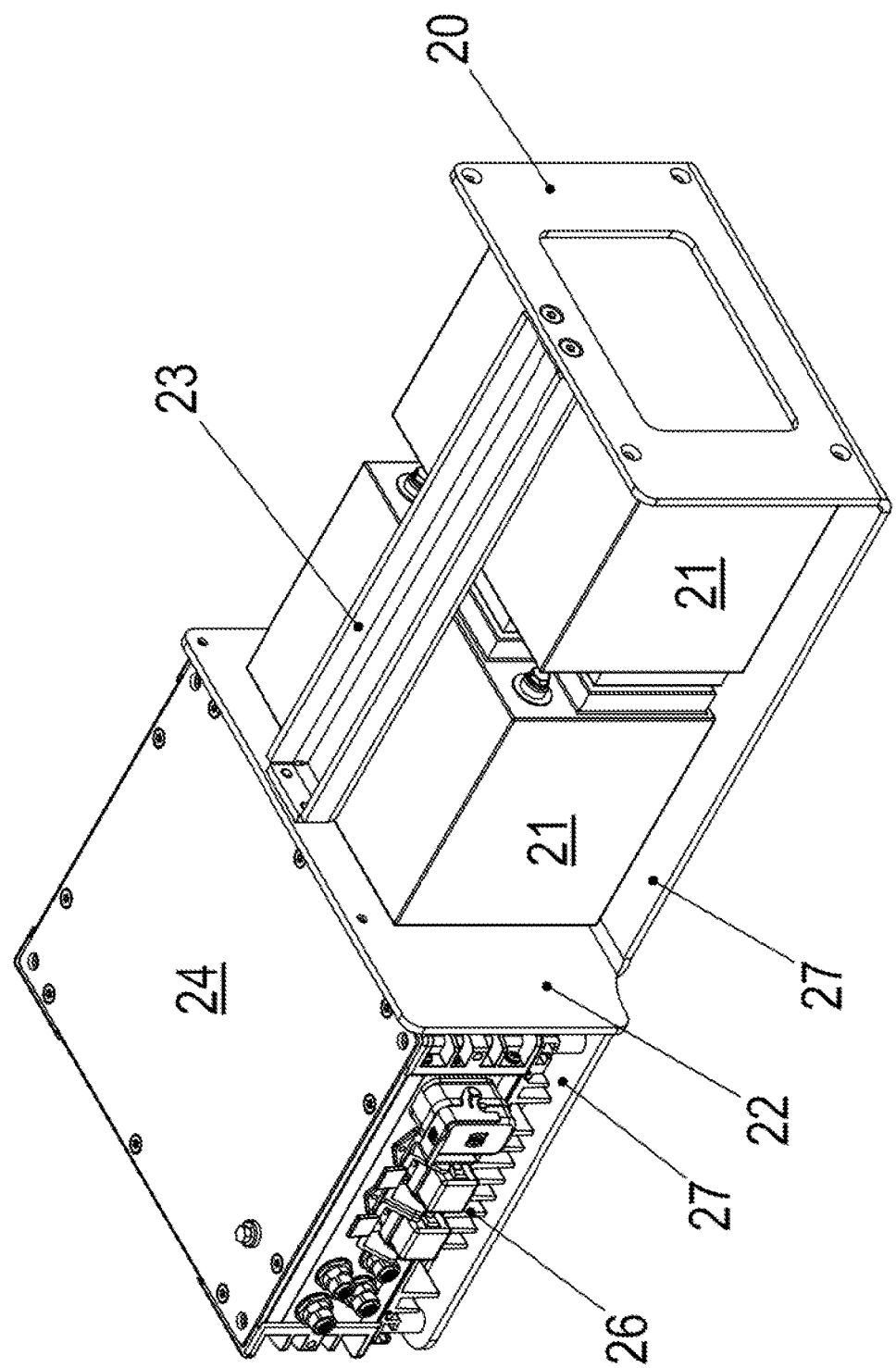
FIG. 6 shows the insert part together with first energy store module illustrated in FIG. 2 in greater detail from another viewing angle.
Figure 7:
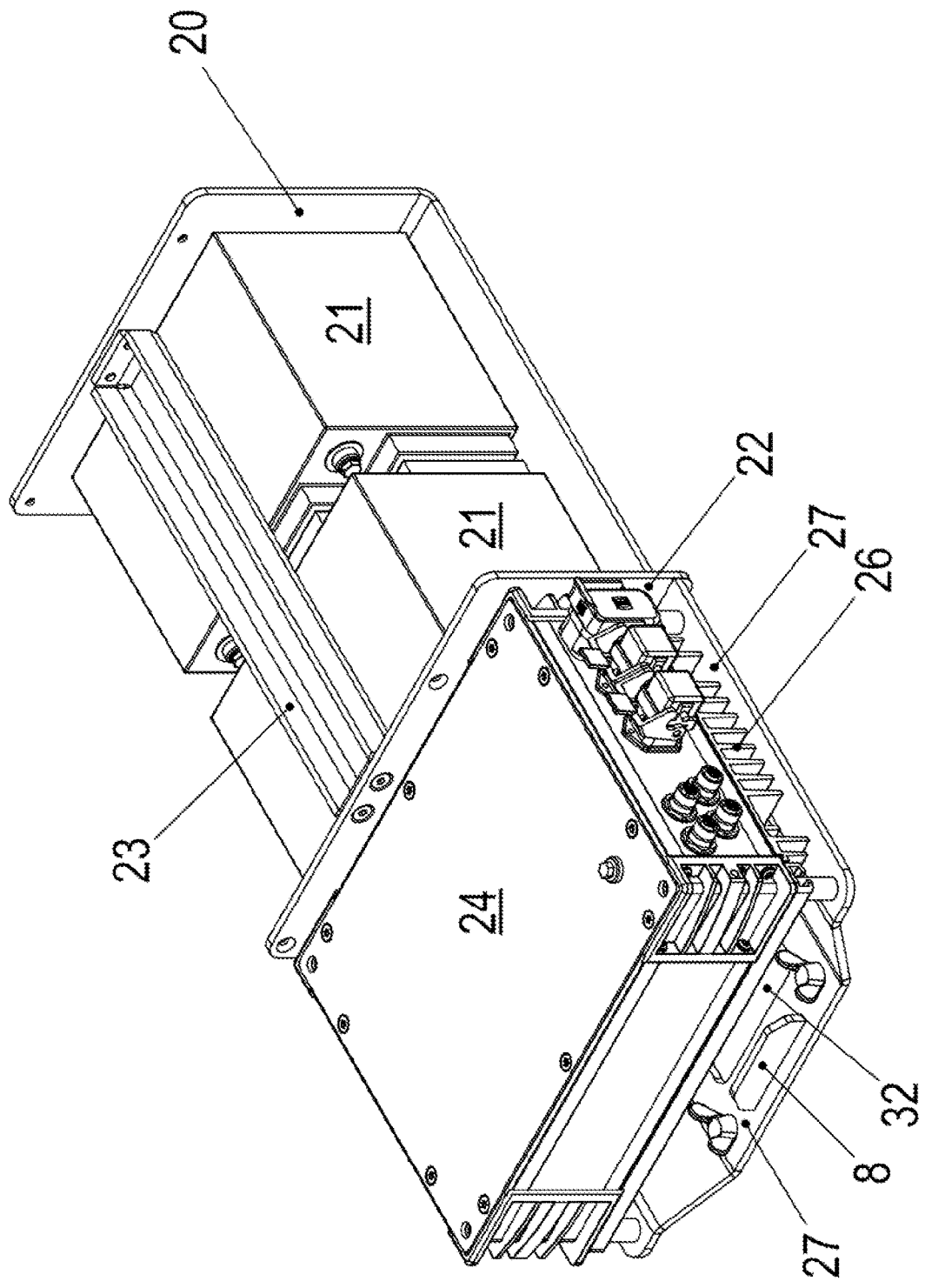
FIG. 7 shows the insert part together with first energy store module illustrated in FIG. 2 in greater detail from a further viewing angle.
Figure 8:
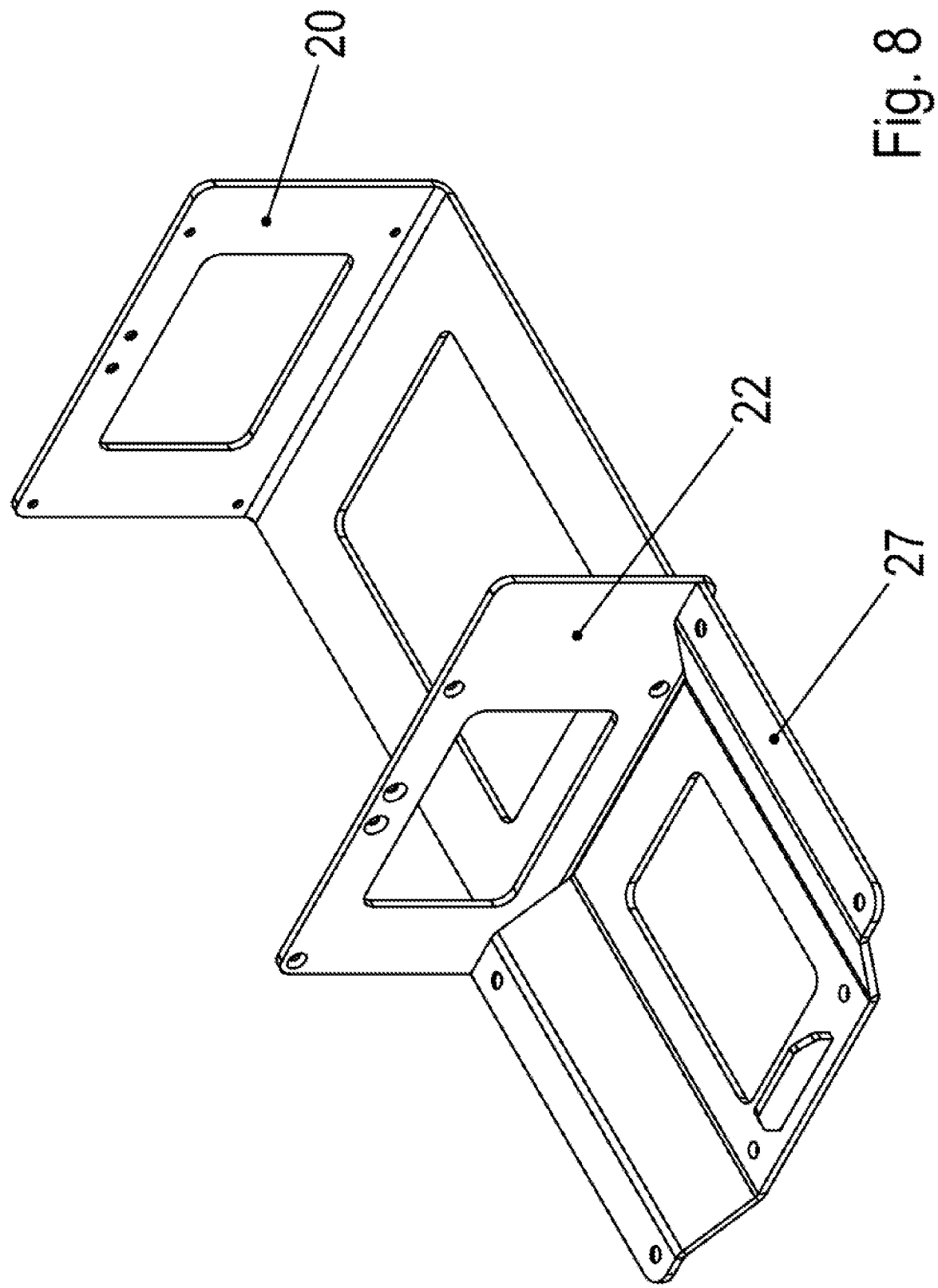
FIG. 8 shows base plate together wide side walls in greater detail in an oblique view.

As illustrated in FIG. 3, second energy store module 31 is attached to a side wall 22 and/or 20 with the aid of screws 30, which extend through the housing of second energy store module 31. This allows for a suspended attachment, and a clearance may once again be provided between base plate 27 of the insert part and second energy store module 31. In this manner, first energy store module 31 is thermally decoupled from base plate 27, and thus also from the heat flow of DC/DC converter 24 introduced via cooling fins 26 into base plate 27.

As illustrated in FIGS. 2 and 3, a handle is situated in the end region of base plate 27 facing the environment, which may function as a carrying handle in conjunction with a recess 32 of the base plate. When separately carrying the insert part, the fingers of the carrier thus reach through recess 32.

Housing component 1 has uninterrupted slots 8, in particular uninterrupted slots 8 that are set apart from one another at regular intervals in the insertion direction and extend transversely to the insertion direction in the base plate of the insert part. This allows cool air to flow through housing component 1.

After the insertion, base plate 27 is resting on housing component 1 so that recess 32 is situated above the region covered by slots 8.

In this manner, the flow of cool air streaming through slots 8 also travels through the recess and thus also arrives directly at cooling fins 26 of the DC/DC converter.

Base plate 27, too, has uninterrupted holes 25, which are aligned with corresponding holes that penetrate housing component 1 after the insertion so that holding screws may be passed through the holes and be fastened with the aid of nuts in order to secure the base plate. After the insertion, a sheet-metal housing component which is to be screwed to the frame covers and protects the space region from the environment.

According to example embodiments of the present invention, the charge capacity of the vehicle is therefore able to be increased with the aid of the insert part. A large additional energy quantity is able to be provided with the aid of first energy store module 21, the peak current being limited during the charging and discharging processes. Much higher peak currents are possible on account of second energy store module 31, the storable energy quantity being slightly smaller than in first energy store module 21. In the latter case, second energy store module 31 may thus be rapidly charged given an inductive supply of the vehicle, and small deviations of the vehicle from the trajectory of the primary conductor are therefore able to be buffered.

Large deviations from the primary conductor are possible utilizing first energy store module 21. However, first energy store module 21 must first be sufficiently charged.

Control 7 includes a corresponding energy management system and uses DC/DC converter 24 as a control element for controlling the energy flow.

Sensors 4, which detect obstacles in a timely manner and thus allow for a stop or a circumvention, are furthermore provided on the vehicle. In addition, an emergency shut-off switch 3 is also accessible from the outside so that the vehicle is able to be shut off.

Base plate 27 has a corresponding form in the region of the trough shape that faces the environment.

The vehicle may be used as a driverless transport system, and thus in particular also as an automatically controlled vehicle. A cover plate is attached to the top surface on the frame of the vehicle and a load to be transported is therefore able to be accommodated. In a further arrangement, the cover plate is situated so as to be variable in its height via a linear actuator, so that the load may be picked up and transported at different heights. In a further arrangement, even a tool for processing the accommodated load, in particular a workpiece, is possible on the cover plate.

LIST OF REFERENCE NUMERALS

1 trough-shaped housing component
2 wheel
3 emergency shut-off switch
4 sensor
5 energy store, in particular a battery
6 AC/DC converter, in particular an adaptive controller
7 control
8 uninterrupted slots, in particular uninterrupted slots that are set apart from one another at regular intervals in the insertion direction and extend transversely to the insertion direction in the base plate of the insert part 20 side wall of the insert part
21 first energy store module
22 side wall of the insert part
23 holding rail
24 DC/DC converter
25 holes
26 cooling body
27 base plate of the insert part
28 handle
30 holding screws
31 second energy store module, in particular ultracap
32 recess

The invention claimed is:

1. A vehicle, comprising:
   a frame;
   a housing component attached to the frame;
   an insert part on the housing component insertable into a space region of the vehicle, a first energy storage module and/or a second energy storage module situated on the insert part; and
   a DC/DC converter electrically connected to an output voltage of at least one of the energy storage modules;
   wherein:
      (a) the first energy storage module differs from the second energy storage module; and/or
      (b) the first energy storage module includes a battery and/or an accumulator, and the second energy storage module includes a double layer capacitor and/or an ultracap capacitor.

2. The vehicle according to claim 1, wherein the vehicle is arranged as a logistics vehicle.

3. The vehicle according to claim 1, wherein a mode of action of the first energy storage module is different from a mode of action of the second energy storage module.

4. The vehicle according to claim 1, wherein the housing component is trough-shaped to guide and/or center the insert part.

5. The vehicle according to claim 4, wherein a depression of the trough extends in an insertion direction.

6. The vehicle according to claim 1, wherein the trough-shaped housing component is adapted to guide the insert part during insertion of the insert part.

7. The vehicle according to claim 1, wherein the housing component includes uninterrupted slots and/or slots that are spaced apart from one another at regular intervals in an insertion direction.

8. The vehicle according to claim 1, wherein the DC/DC converter is electrically connected to an intermediate circuit adapted to supply an inverter that feeds an electric motor.

9. The vehicle according to claim 1, wherein the electric motor is adapted to drive a wheel of the vehicle.

10. The vehicle according to claim 1, wherein a secondary winding is provided on an underside of the vehicle, to which energy is transmittable from a primary conductor installed in a driving surface.

11. The vehicle according to claim 10, wherein energy is suppliable from the secondary winding to an intermediate circuit of the vehicle.

12. The vehicle according to claim 10, wherein energy is suppliable from the secondary winding to an intermediate circuit of the vehicle via an AC/DC converter.

13. The vehicle according to claim 10, wherein a capacity is connected to the secondary winding in series and/or parallel, so that a resonant frequency of a resulting oscillating circuit corresponds to a frequency of alternating current impressed into the primary conductor.

14. The vehicle according to claim 1, wherein an energy storage device, an accumulator, and/or a battery, adapted to supply at least a control of the vehicle, is provided on the frame of the vehicle.

15. A vehicle, comprising:
   a frame;
   a housing component attached to the frame;
   an insert part on the housing component insertable into a space region of the vehicle, a first energy storage module and/or a second energy storage module situated on the insert part; and
   a DC/DC converter electrically connected to at least one of the energy storage modules;
   wherein:
      (a) the first energy storage module differs from the second energy storage module; and/or
      (b) the first energy storage module includes a battery and/or an accumulator, and the second energy storage module includes a double layer capacitor and/or an ultracap capacitor; and
   wherein the insert part includes a base plate having a recess, a perpendicular projection of the recess into a driving surface of the vehicle overlaps with a perpendicular projection of slots of the housing component into the driving surface.

16. The vehicle according to claim 15, wherein the slots are adapted to convey cool air entering through the slots through the recess to cooling fins of the DC/DC converter.

17. The vehicle according to claim 15, wherein the DC/DC converter includes cooling fins on a side facing the base plate.

18. The vehicle according to claim 15, wherein a plug-connector part is provided on the base plate and is adapted for plug-in contact with a corresponding mating plug-connector part connected to the frame of the vehicle when the insert part is inserted.

19. The vehicle according to claim 18, wherein the plug-connector part includes a hybrid plug-connector part, first contacts being connected to a DC-voltage connection of the DC/DC converter, and second contacts being adapted to conduct signals from a data bus provided between a control of the vehicle and the DC/DC converter.

20. The vehicle according to claim 15, wherein a handle is provided on the base plate and/or uninterrupted holes are provided to secure the insert part on the housing component using screws.

21. The vehicle according to claim 15, wherein a side wall adapted to hold the first energy storage module and/or the second energy storage module is connected to the base plate.

22. A vehicle, comprising:
   a frame;
   a housing component attached to the frame;
   an insert part on the housing component insertable into a space region of the vehicle, a first energy storage module and/or a second energy storage module situated on the insert part; and
   a DC/DC converter electrically connected to at least one of the energy storage modules;
   wherein:
      (a) the first energy storage module differs from the second energy storage module; and/or
      (b) the first energy storage module includes a battery and/or an accumulator, and the second energy storage module includes a double layer capacitor and/or an ultracap capacitor; and
   wherein after the insert part is inserted and the DC/DC converter is electrically connected to an intermediate circuit of the vehicle, the DC/DC converter is automatically detected and operated as a bus subscriber of a data bus of the vehicle to control the energy flow according to the input by an energy management system.

23. A vehicle, comprising:
a frame;
a housing component attached to the frame;
an insert part on the housing component insertable into a space region of the vehicle, a first energy storage module and/or a second energy storage module situated on the insert part; and
a DC/DC converter electrically connected to at least one of the energy storage modules;
wherein:
  (a) the first energy storage module differs from the second energy storage module; and/or
  (b) the first energy storage module includes a battery and/or an accumulator, and the second energy storage module includes a double layer capacitor and/or an ultracap capacitor;
wherein a secondary winding is provided on an underside of the vehicle, to which energy is transmittable from a primary conductor installed in a driving surface;
wherein energy is suppliable from the secondary winding to an intermediate circuit of the vehicle; and
wherein two side walls of the insert part are secured in position on the base plate, to which the second energy storage module is screw-fitted by a screw that passes through a housing of the second energy storage module, so that a clearance is present between the second energy storage module and the base plate, and/or between which a holding rail is secured on which the first energy storage module is kept suspended, so that a clearance is present between the first energy storage module and the base plate.

24. A vehicle, comprising:
a frame;
a housing component attached to the frame;
an insert part on the housing component insertable into a space region of the vehicle, a first energy storage module and/or a second energy storage module situated on the insert part; and
a DC/DC converter electrically connected to at least one of the energy storage modules;
wherein:
  (a) the first energy storage module differs from the second energy storage module; and/or
  (b) the first energy storage module includes a battery and/or an accumulator, and the second energy storage module includes a double layer capacitor and/or an ultracap capacitor; and
wherein the space region is also restricted by at least the frame, the base plate, a housing sheet-metal part connected to the frame of the vehicle, and a cover plate, the space region being covered by the sheet-metal housing component in a direction of the environment, the sheet-metal housing component being connected to the frame by screws.

* * * * *